(12) United States Patent
Vazach

(10) Patent No.: US 8,981,756 B2
(45) Date of Patent: Mar. 17, 2015

(54) ADAPTIVE THRESHOLD VOLTAGE FOR FREQUENCY INPUT MODULES

(75) Inventor: Joseph G. Vazach, Mentor, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 275 days.

(21) Appl. No.: 13/444,392

(22) Filed: Apr. 11, 2012

(65) Prior Publication Data

US 2013/0271112 A1 Oct. 17, 2013

(51) Int. Cl.
*G01R 23/16* (2006.01)
*G01D 5/244* (2006.01)

(52) U.S. Cl.
CPC .................................. *G01D 5/2448* (2013.01)
USPC .................. 324/76.19; 324/76.12; 324/76.21; 324/76.22

(58) Field of Classification Search
CPC .................... G01R 23/00; G01R 23/16–23/18; G01R 23/165; G01R 23/173
USPC ................. 324/76.196, 76, 76.19, 76.12, 702
See application file for complete search history.

(56) References Cited

U.S. PATENT DOCUMENTS

| | | | | |
|---|---|---|---|---|
| 4,129,827 A | * | 12/1978 | Southwick | 324/76.14 |
| 4,440,976 A | * | 4/1984 | Bocci et al. | 380/277 |
| 4,833,399 A | * | 5/1989 | So | 324/76.28 |
| 5,844,430 A | * | 12/1998 | Thurnau et al. | 327/74 |
| 6,522,396 B1 | * | 2/2003 | Halmos | 356/5.01 |
| 7,750,618 B1 | * | 7/2010 | Fang et al. | 324/76.41 |
| 2002/0154652 A1 | * | 10/2002 | Yoshimura et al. | 370/442 |
| 2008/0048746 A1 | * | 2/2008 | Raman | 327/205 |
| 2010/0231202 A1 | * | 9/2010 | Scheller et al. | 324/173 |
| 2010/0290646 A1 | * | 11/2010 | Pillonnet et al. | 381/120 |
| 2011/0048102 A1 | * | 3/2011 | Fernandez et al. | 73/1.79 |
| 2011/0187424 A1 | * | 8/2011 | Grewing et al. | 327/156 |
| 2012/0262133 A1 | * | 10/2012 | Martinelli | 323/234 |
| 2012/0280681 A1 | * | 11/2012 | David et al. | 324/251 |
| 2013/0161528 A1 | * | 6/2013 | Wang et al. | 250/395 |
| 2013/0177040 A1 | * | 7/2013 | Foletto et al. | 374/142 |

* cited by examiner

*Primary Examiner* — Arleen M Vazquez
*Assistant Examiner* — Dominic Hawkins
(74) *Attorney, Agent, or Firm* — Boyle Fredrickson, S.C.

(57) ABSTRACT

Systems and methods for an industrial I/O controller circuit for frequency input modules that measure the frequency of an electrical input signal using adaptive threshold voltage and/or adaptive hysteresis feedback are shown and described. The systems and methods provide advantages in that the I/O controller circuit can better distinguish between actual input pulses from the electrical input signal, as opposed to unwanted Electromagnetic Interference (EMI) induced input pulses. This maximizes the amount of EMI rejection, independent of the frequency of the moving machine, and results in less time to commission and adjust a sensor, fewer false frequency measurements and less system down time.

18 Claims, 9 Drawing Sheets

ADAPTIVE THRESHOLD VOLTAGE FOR FREQUENCY INPUT MODULES

BACKGROUND OF THE INVENTION

The present invention relates to industrial I/O controller circuits for industrial control systems, and in particular to industrial I/O controller circuits for frequency input modules that measure system frequencies using adaptive threshold voltage and/or adaptive hysteresis feedback.

Industrial controllers are specialized computer systems used for the control of industrial processes or machinery, for example, in a factory environment. Industrial controllers typically comprise I/O controller circuits to accomplish different functions as part of the industrial control system. One such function is measuring the frequency or revolutions per minute (RPM) of a moving machine, such as a large rotating toothed wheel, so that some action may be taken by the industrial control system. For example, an industrial controller may comprise an I/O controller circuit used for measuring the frequency of a turbine engine so that additional power can be applied to (or removed from) the turbine engine by the industrial controller based on the measured frequency.

In such frequency measuring applications, the electromagnetic field produced by the physical motion, of the moving machine may be sensed by a sensor positioned in close proximity to the machine. The sensor may then, produce, an electrical signal of varying frequency and amplitude, approximately corresponding to the periodic motion of the machine. A variable reluctance sensor comprising a permanent magnet and a pick up coil is typical sensor that may be used for such motion sensing applications.

The electrical signal may be inputted to a threshold detector and compared to a predetermined threshold level to produce a square wave digital output signal having first and second states, e.g. logic zero and logic one. The states of the square wave digital output may reflect the frequency of the machine. The output may subsequently be processed by digital hardware, software or any combination thereof in the industrial control system. In operation, each time the electrical input signal crosses the predetermined threshold level, the threshold detector toggles the square wave digital output signal it produces between the first and second states.

In application, the electrical signals produced by sensors are often subject to noise and distortion due to electromagnetic interference (EMI). EMI may originate from other machinery in the factory environment, or by cross-coupling from neighboring channels, such as by another electrical signal from a nearby sensor. The result of EMI is a loss of signal integrity in the electrical signal, which may cause random noise and ringing to the electrical signal.

To oppose the effects of EMI, ferrite beads or other filtering circuitry may be applied to the electrical signal to improve signal integrity. Such filtering inherently reduces the time resolution of the derived digital signal by removing high-frequency components of the sensed signal. The use of hysteresis may also be employed to reduce the effects of electrical noise.

The strength of the electrical signal from a variable reluctance type sensor may vary significantly depending on the placement of the sensor and speed of movement of the sensed metal element. For this reason, the threshold used to produce the desired square wave signal can be a complicated exercise. Placing the threshold too low will make the sensor susceptible to electrical noise whereas placing the threshold too high may cause the system to fail to detect low level signals from the variable reluctance sensor at low machine speeds. Similar problems arise with respect to determining the amount of hysteresis that is optimum.

SUMMARY OF THE INVENTION

The present, invention provides a dynamic threshold for variable reluctance type sensors that automatically adjust the detection threshold depending on the frequency of the received signal. Frequency serves as a proxy for the expected strength of the sensor signal that is relatively immune to momentary bursts of electrical noise. By automatically raising the threshold with increased frequency of the sensor signal, precise setting of the threshold is less critical and an improved trade-off between threshold level, noise resistance, and sensitivity to sensor signal may be obtained.

In one embodiment, the invention provides an industrial I/O circuit for measuring the frequency of an electrical input signal. The circuit comprises an input port for receiving an electrical input signal having a frequency; a threshold generator providing a threshold level; and a threshold detector coupled to the input port for receiving the electrical input signal and to the threshold generator for receiving the threshold level. The threshold detector compares the electrical input signal to the threshold level to produce an electrical digital output signal having a first state when the electrical input signal is detected below the threshold level and a second state when the electrical input signal is detected above the threshold level. The threshold generator is operative to adjust the threshold level in response to the frequency of the electrical input signal.

The threshold generator may further comprise a counter and a timer for counting one or more transitions between the first state and the second state of the electrical digital output signal over a length of time wherein the value of the counter is used to determine the frequency of the electrical input signal for adjusting the threshold level. The threshold generator may also set the threshold level between a discrete first and second predetermined threshold level in response to the frequency of the electrical input signal crossing a predetermined frequency threshold. The threshold generator may also provide a high threshold level or a low threshold level to adjust depending on a direction of transition of the electrical input signal to provide hysteresis.

The threshold generator may further include a hysteresis generator operative to adjust the separation between the high threshold level and the low threshold level in response to the frequency of the electrical input signal. The threshold generator may also provide hysteresis by feeding back a signal from the output of the threshold detector to its input and setting the amount of feedback to a predetermined amount in response to the frequency of the electrical input signal crossing a predetermined frequency threshold. The industrial I/O controller may also comprise a housing including a screw terminal connected to the input port, and holding circuitry of the threshold generator, the threshold detector and the hysteresis generator, and further include a communication port coupled to the threshold generator for external digital data communication.

In an alternative embodiment, the circuit comprises an input port for receiving an electrical input signal; an amplifier coupled to the input port for receiving the electrical input signal and providing an amplified signal; a threshold generator providing a threshold level; and a threshold detector coupled to the amplifier for receiving the amplified signal and to the threshold generator for receiving the threshold level. The threshold detector compares the amplified signal to the threshold level to produce an electrical digital output signal having a first state when the amplified signal is detected below the threshold level and a second state when the amplified signal is detected above the threshold level. The threshold generator also provides a high threshold level or a low threshold level depending on a direction of transition of the electrical input signal to provide hysteresis. The threshold generator further includes a hysteresis generator operative to adjust the separation between the high threshold level and the low threshold level in response to the frequency of the electrical input signal.

The hysteresis generator may further comprise a counter and a timer for counting one or more transitions between the first state and the second state of the electrical digital output signal over a length of time wherein the value of the counter is used to determine the frequency of the electrical input signal for adjusting the separation between the high threshold level and the low threshold level. The threshold generator may also provide hysteresis by feeding back a signal from the output of the threshold detector to its input and setting the amount of hysteresis feedback to a predetermined amount in response to the frequency of the electrical input signal crossing a predetermined frequency threshold. The threshold generator may also set the gain of the amplifier to a predetermined amount in response to the frequency of the electrical input signal crossing a predetermined frequency threshold. The industrial I/O controller may also comprise a housing including a screw terminal connected to the input port, and holding circuitry of the amplifier, the threshold generator, the threshold detector and the hysteresis generator, and further including a communication port coupled to the threshold generator for external digital data communication The present invention also provides a method for measuring the frequency of an electrical input signal in an industrial I/O controller. The method comprises receiving an electrical input signal having a frequency; providing a threshold level; comparing the electrical input signal to the threshold level to produce an electrical digital output signal having a first state when the electrical input signal is detected below the threshold level and a second state when the electrical input, signal is detected above the threshold level; and adjusting the threshold level in response to the frequency of the electrical input signal. Adjusting the threshold level may further comprise counting one or more transitions between the first state and the second state of the electrical digital output signal over a length of time and using the counted value to determine the frequency of the electrical input signal for adjusting the threshold level.

The method may farther comprise setting the threshold level between a discrete first and second predetermined threshold level in response to the frequency of the electrical input signal crossing a predetermined frequency threshold. The method may further comprise providing a high threshold level or a low threshold level for adjusting depending on a direction of transition of the electrical input signal to provide hysteresis. The method may further comprise adjusting the separation between the high threshold level and the low threshold level depending on the frequency of the electrical input signal. The method may further comprise setting the amount of hysteresis feedback to a predetermined amount in response to the frequency of the electrical input signal crossing a predetermined frequency threshold.

By designing the I/O controller circuit to adapt its input circuitry according to the frequency of the moving machine, the I/O controller circuit can better distinguish between actual input pulses from the electrical input signal, as opposed to unwanted EMI induced input pulses. This maximizes the amount of EMI rejection, independent of the frequency of the moving machine, and results in less time to commission and adjust a sensor, fewer false frequency measurements and less system down time. These particular objects and advantages may apply to only some embodiments falling within the claims and thus do not define the scope of the invention.

BRIEF DESCRIPTION OF THE DRAWINGS

FIG. 3b is an example waveform of an electrical digital output signal produced by comparing the electrical input signal of FIG. 3a to the related threshold level of FIG. 3a;

FIG. 6b is an example waveform of an electrical digital output signal produced by comparing the electrical input signal of FIG. 6a to the related hysteresis range of FIG. 6a;

DETAILED DESCRIPTION OF THE PREFERRED EMBODIMENT

Figure 1:
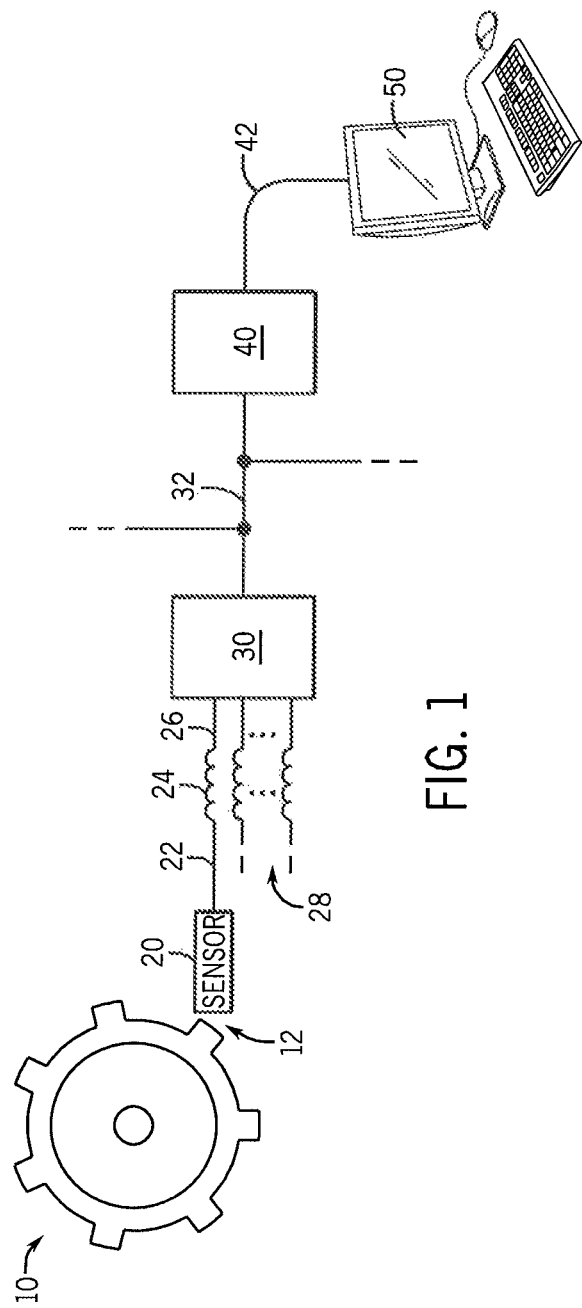
FIG. 1 is a system view of an industrial control system using an embodiment of the present invention.

Referring now to FIG. 1, a large rotating toothed wheel 10 is shown as a moving machine in an industrial application system. The wheel 10 may be used in any various industrial applications, such as a turbine engine, a gear on an assembly line or a cooling fan. The wheel 10 may rotate with varying speeds ranging from stationary to as fast as the industrial system will allow, and could come alternatively in other shapes and with other periodic motions, such as a toothed rod moving linearly back and forth.

In close proximity to the wheel 10 is a sensor 20 which may detect variations in the electromagnetic field produced by the physical motion of the wheel 10 across a gap 12. The sensor 20 may be for example a variable reluctance sensor comprising a permanent magnet and a pick up coil as known in the art. In response to variations in the electromagnetic field, the sensor 20 produces an electrical input signal of varying frequency and amplitude that approximately corresponds to the periodic motion of the wheel 10. In other words, a low speed rotation of the wheel 10 would result in the sensor 20 producing a weak electrical input signal having low frequency and small amplitude, whereas a high speed rotation of the wheel 10 would result in the sensor 20 producing a strong electrical input signal having high frequency and large amplitude.

The electrical input signal produced by the sensor 20 is then transmitted along a conductor 22 through an optional filter, such as ferrite bead 24, which may serve to filter noise and distortion due to EMI. The source of EMI may include the operation of other machinery in the factory environment, or cross-coupling from neighboring channels, such as another electrical input signal from another nearby conductor, sensor and toothed wheel. Conductors 28 may be for example neighboring channels with electrical input signals from other conductors, sensors and toothed wheels, which may be sources of EMI by cross-coupling with conductor 22. Ferrite bead 24 may alternatively be any other resistor, inductor and/or capacitor network if desired for advantageously improving signal integrity as known in the art. The electrical input signal then continues along conductor 26 to industrial I/O controller circuit 30. Conductor 26, as well as conductors 28, may connect to controller circuit 30 via screw terminals, though other methods of electro-mechanical connection to controller circuit 30 are possible as known in the art.

The controller circuit 30 adaptively measures the frequency of the electrical input signal received on conductor 26, as well as conductors 28 if so configured. The controller circuit 30 then externally communicates digital data with the industrial system over a bus or backplane 32, which may include several other industrial control circuits or other modules connected to the backplane 32, such as industrial control module 40. The digital information communicated over backplane 32 may include, for example, configuration information for configuring the controller circuit 30, and measured frequency data as reported by the controller circuit 30. Module 40 may include a data connection 42, such as an Ethernet connection, to data terminal equipment 50 which may be used to configure, monitor and control the industrial system by a user.

Figure 2:
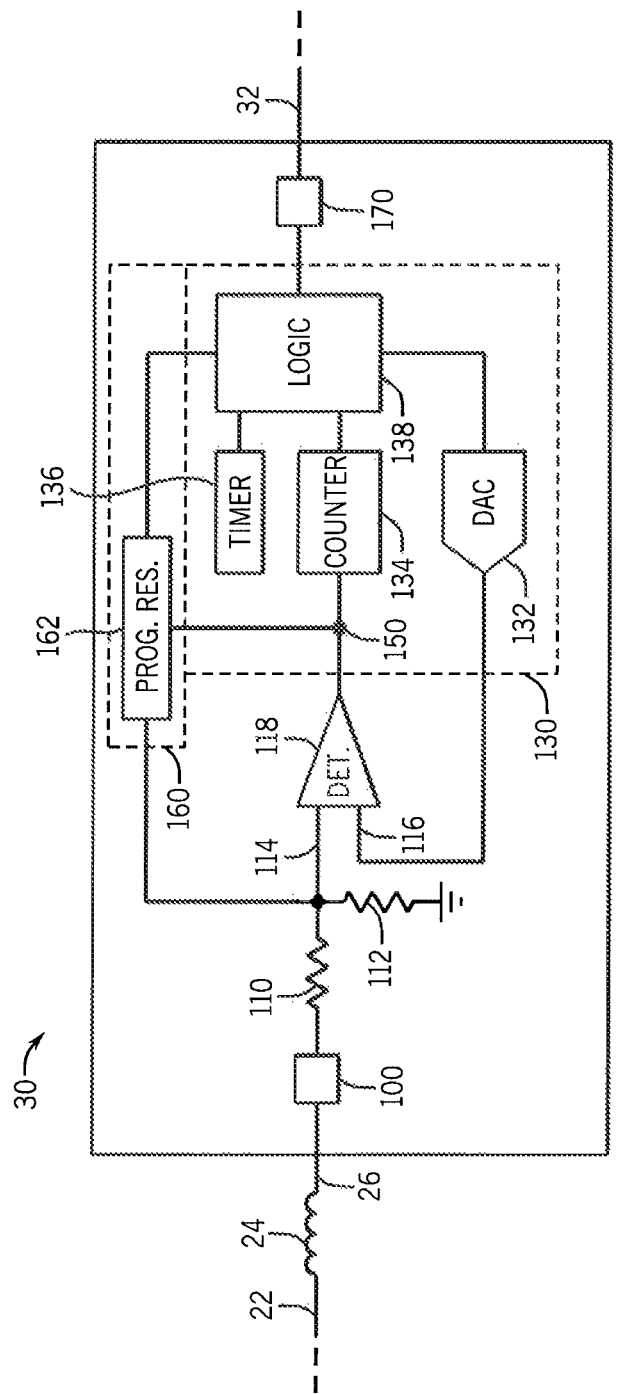
FIG. 2 is an embodiment of an industrial I/O controller circuit of the present invention, which is a part of the industrial control system.

Referring now to FIG. 2, in one embodiment the controller circuit 30 has an input port 100 for receiving the electrical input signal produced by the sensor 20. From the input port 100, the electrical input signal passes through a voltage divider comprised of resistors 110 and 112, and then to an input 114 of a threshold detector 118, which may be, for example, the non-inverting input of an analog comparator or an operational amplifier configured to operate in saturation. The threshold detector 118 compares the electrical input signal received at its input 114 to a threshold level provided by a threshold generator 130 that is received at another input 116 of the threshold detector 118, which may be, for example, the inverting input of an analog comparator or an operational amplifier. In operation, if the electrical input signal received at the input 114 is detected by the threshold detector 118 to be below the threshold level received at the other input 116, then the threshold detector 118 will produce an electrical digital output signal at conductor 150 having a first digital state, such as a logic zero. If the electrical input signal received at the input 114 is detected by the threshold detector 118 to be above the threshold level received at the other input 116, then the threshold detector 118 will produce an electrical digital output signal at conductor 150 having a second digital state, such as a logic one. The threshold detector 118 thereby produces a square wave digital output signal at conductor 150.

The electrical digital output signal at conductor 150 is transmitted to a threshold generator 130, which may be a microcontroller or other programmable logic, comprising a digital to analog converter (DAC) 132, a counter 134, a timer 136 and processing logic 138. In one embodiment, the electrical digital output signal at conductor 150 is received by the threshold generator 130 at the counter 134, which may count the transitions between the first state and the second state of the electrical digital output signal and report the counted transitions to the logic 138. The timer 136 provides a time base to the logic 138, so that the logic 138 may continuously or occasionally measure the frequency of the electrical digital output signal by dividing the count received by the counter 134 over a length of time indicated by the timer 136, e.g. cycles per second (Hz). The controller circuit 30 may also have a communication port 170 coupled to logic 138, which may externally communicate bi-directional digital data over backplane 32 according to known protocols. The digital data communicated may include reporting the measured frequency or other data to the industrial system, or receiving configuration information or other data from the industrial system.

The threshold generator 130 is operative to adjust the threshold level received at the input 116 of the threshold detector 118 in response to the frequency measured by the logic 138. For example, if the logic 138 measures a lower frequency, e.g. 10 Hz, then the logic 138 may digitally control the DAC 132 to provide a lower threshold level to the input 116 of the threshold detector 118. If the logic 138 measures a higher frequency, e.g. 5 kHz, then the logic 138 may digitally control the DAC 132 to provide a higher threshold level to the input 116 of the threshold detector 118. The logic 138 may digitally control the DAC 132 to adjust the threshold level dynamically, such as by continuously adjusting the threshold level in response to changes in frequency to the granularity that the DAC 132 allows.

In addition, in a preferred embodiment, the logic 138 may digitally control the DAC 132 to adjust the threshold level to a predetermined value in response to reaching a predetermined frequency amount. Alternatively, some combination of adjusting dynamically and then at predetermined frequency amounts may be used. The logic 138 could also adjust the threshold level with additional intelligence. For example, if the logic 138 measures a frequency of 2.75 KHz, causing the logic 138 to digitally control the DAC 132 to apply a threshold level of 10 V, and then the logic 138 measures a frequency of 3.0 KHz, causing the logic 138 to digitally control the DAC 132 to apply a threshold level of 12 V, the logic 138 could be advantageously configured not to lower the threshold level again below 12 V until an even lower frequency is measured, such as 2.5 kHz. This may avoid undesirable rapid changes in the system. The various parameters used by logic 138, including the time base over which frequency is measured, how often frequency is measured, whether the threshold level adjusts dynamically or based on predetermined values or both, the predetermined values corresponding to the predetermined frequencies, etc., may be hard coded in logic 138, supplied by the industrial system via communication port 170, or any combination thereof.

Figure 3A:
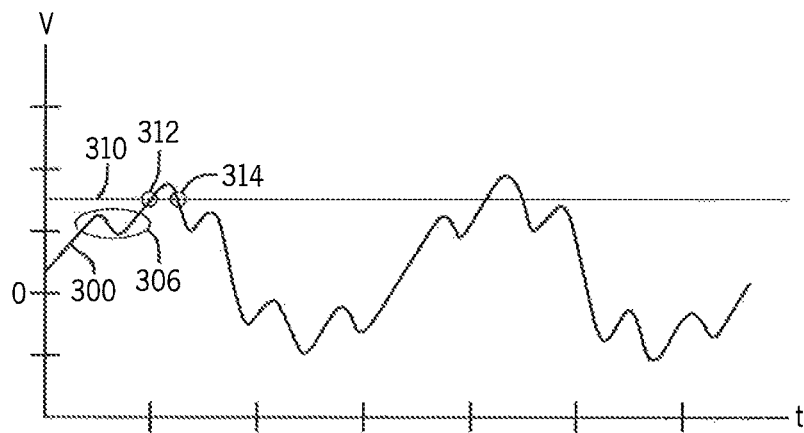
FIG. 3a is an example analog waveform of an electrical input signal provided by a sensor as a machine operates slowly, showing the effects of EMI or signal crosstalk on the signal integrity of the electrical input signal, and showing the related threshold level.
Figure 3B:
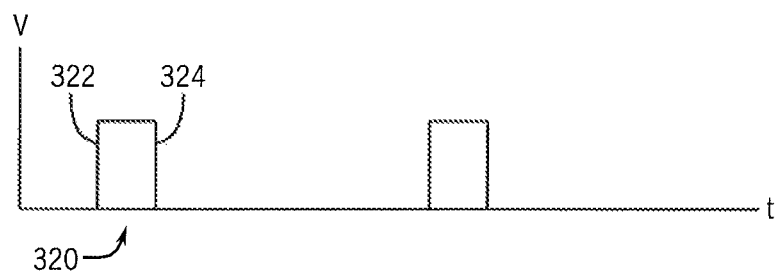

Referring now to FIG. 3a, an electrical input signal 300 is shown as it might appear at the input port 100 of the controller circuit 30. The electrical input signal 300 has a low frequency and small amplitude which may indicate a weak signal from slowly moving machine. The electrical input signal 300 is also more susceptible to EMI and has poor signal integrity, including noise 306. As the electrical input signal 300 crosses the threshold level 310, the threshold detector 118 produces the electrical digital output signal 320 shown in FIG. 3b. The electrical input signal 300 transitioning up and crossing the threshold level 310 at the intersection 312 produces the electrical digital output signal 320 moving from the logic low state to the logic high state 322. The electrical input signal 300 then transitioning down and crossing the threshold level 310 at the intersection 314 produces the electrical digital output signal 320 moving from the logic high state to the logic low state 324. Here, the threshold level 310 allows the threshold detector 118 to produce the electrical digital output signal 320 at the correct frequency.

Figure 4A:
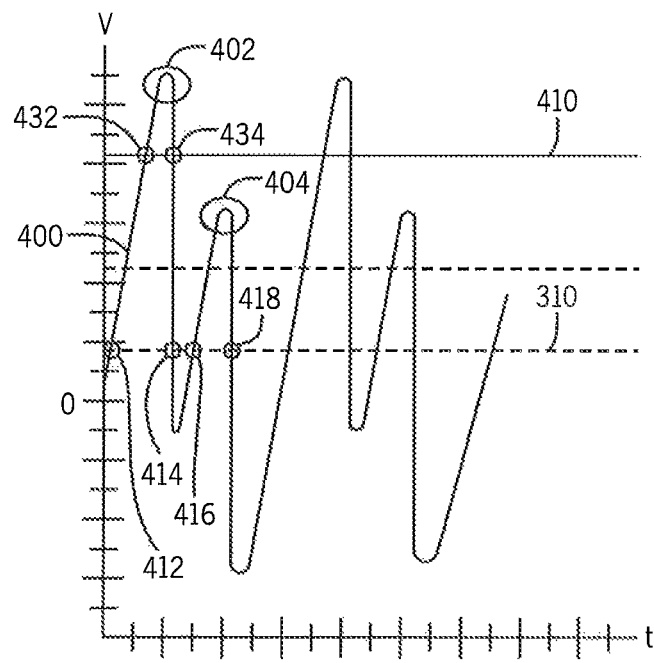
FIG. 4a is an example analog waveform of an electrical input signal provided by a sensor as a machine operates quickly, showing the effects of EMI or signal crosstalk on the signal integrity of the electrical input signal, and showing a related low threshold level and an alternatively raised threshold level.
Figure 4B:
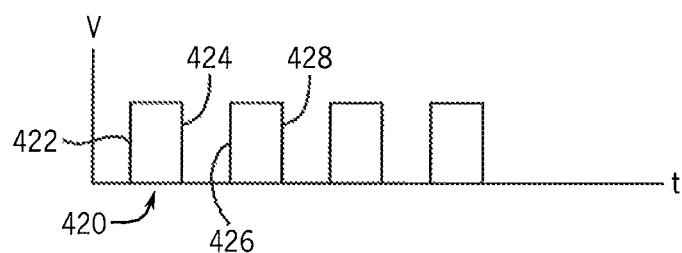
FIG. 4b is an example waveform of an electrical digital output signal produced by comparing the electrical input signal of FIG. 4a to the related low threshold level of FIG. 3a, thereby producing an incorrect digital frequency.

Referring now to FIG. 4a, the same electrical input signal 400 now appears later in time having a high frequency and large amplitude, which may indicate a stronger signal from a more quickly moving machine. The high frequency and large amplitude of the electrical input signal 400 results in an overshoot 402 and ringing 404. Using the same low threshold level 310 from before, despite the increase in frequency and amplitude, causes the threshold detector 118 to produce an electrical digital output signal 420 with an incorrect doubled frequency shown in FIG. 4b. In other words, due to the increased overshoot 402 and ringing 404, the electrical input signal 400 crosses the threshold level 310 at additional intersections 414 and 416. As a result, the electrical digital output signal 420 incorrectly includes additional transitions 424 and 426, resulting in an incorrectly doubled frequency.

Figure 4C:
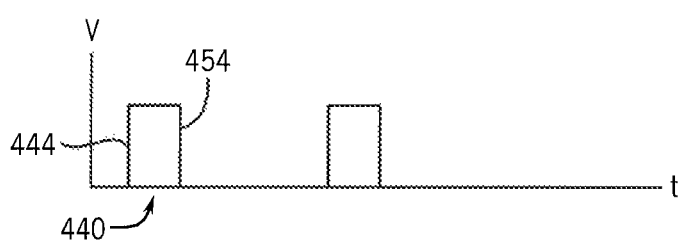
FIG. 4c is an example waveform of an electrical digital output signal produced by comparing the electrical input signal of FIG. 4a to the alternatively raised threshold level of FIG. 4a, thereby producing the correct digital frequency.

However, with the threshold generator 130 operative to adjust the threshold level 310 to a higher threshold level 410 in response to the measured higher frequency, the threshold detector 118 produces the correct electrical digital output signal 440 shown in FIG. 4c. The increased overshoot 402 and ringing 404 does not result in crossing the higher threshold level 410 at additional intersections. Thus, the proper frequency is produced.

Figure 5:
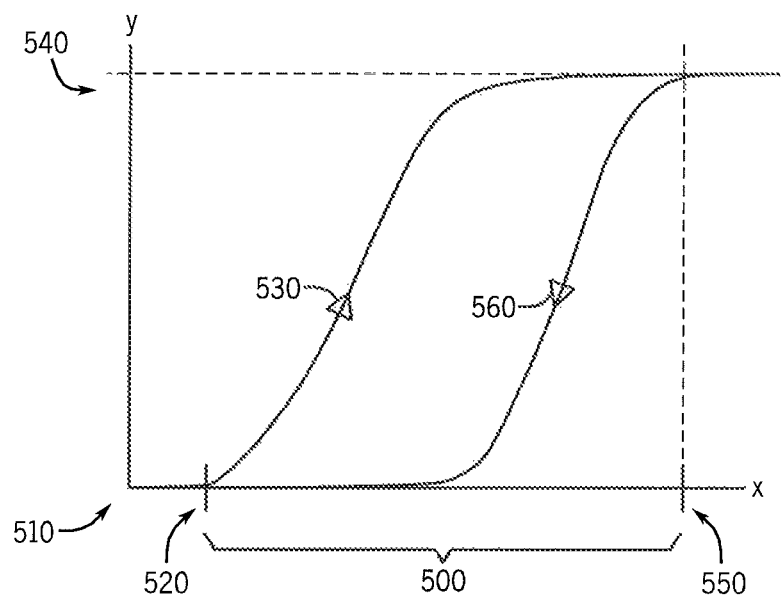
FIG. 5 is an example diagram demonstrating the effect of hysteresis feedback in a system.

Referring again to FIG. 2, the controller circuit 30 may also include a hysteresis generator 160 to provide hysteresis feedback to the electrical input signal. Hysteresis feedback may be applied to resist undesirable rapid changes. Referring briefly to FIG. 5, a hysteresis diagram is shown with a hysteresis range 500 in which a first state 510 is maintained by a system until a first value 520 causes a transition 530 to a second state 540, but then the second state 540 is maintained by the system until a second value 550 less than the first value 520 is causes a transition 560 back to the first state 510. By using a hysteresis range having lower and upper values depending from the current state, as opposed to using a single value independent of the current state, undesirable rapid changes may be avoided. Referring back to FIG. 2, the hysteresis generator 160 is shown using a digitally programmable resistor 162 configured by logic 138 (a static resistor may be used instead if adjustability is not desired). The resistor 162 receives the electrical digital output signal at conductor 150 and provides feedback to strengthen the electrical input signal at the input 114 of the threshold detector 118. As a result, if the threshold detector 118 produces an electrical digital output signal at conductor 150 having a high logic state, the resistor 162 will feed back part of the electrical digital output signal to the input 114 of the threshold detector 118 thereby adding to the electrical input signal. If however the threshold detector 118 produces an electrical digital output signal at conductor 150 having a low logic sate, the resistor 162 will feed back part of the electrical digital output signal to the input 114 of the threshold detector 118 thereby subtracting from the electrical input signal. The result is an increased opposition of the electrical input signal from crossing the threshold level again, which may avoid undesirable rapid change. This is analogous to the operation of a Schmitt trigger. In an alternative embodiment, feedback from the electrical digital output signal may instead be provided to the input 116 of the threshold detector 118, thereby adding to or subtracting from the threshold level.

Similar to the threshold generator 130, the hysteresis generator 162 may be operative to adjust the amount of hysteresis feedback based on the measured frequency. In this case, the hysteresis generator 160 may utilize the same microcontroller or other programmable logic functioning to serve the threshold generator 130, if present. The hysteresis generator 162 may comprise the counter 134, the timer 136, the logic 138 and the resistor 162. Referring again to the embodiment shown in FIG. 2, the electrical digital output signal at conductor 150 is received by the hysteresis generator 160 at the counter 134, which may count the transitions between the first state and the second state of the electrical digital output signal and report the counted transitions to the logic 138. The timer 136 provides a time base to the logic 138, so that the logic 138 may continuously or occasionally measure the frequency of the electrical digital output signal by dividing the count received by the counter 134 over a length of time received by the timer 136, e.g. cycles per second (Hz).

The logic 138 may then adjust the resistor 162 in response to the measured frequency, thereby adjusting the amount of hysteresis feedback to the input 114 of the threshold detector 118. For example, if the logic 138 measures a lower frequency, e.g. 10 Hz, then the logic 138 may digitally control the resistor 162 to provide less feedback to the input 114 of the threshold detector 118. If the logic 138 measures a higher frequency, e.g. 5 kHz, then the logic 138 may digitally control the resistor 162 to provide more feedback to the input 114 of the threshold detector 118. Again, in an alternative embodiment, feedback may instead be provided to the input 116 of the threshold detector 118. The logic 138 may digitally control the resistor 162 to adjust the amount of feedback dynamically, such as adjusting the amount of hysteresis feedback continuously in response to changes in frequency to the granularity that the resistor 162 allows. In addition, in a preferred embodiment, the logic 138 may digitally control the resistor 162 to apply a predetermined amount of feedback in response to reaching a predetermined frequency amount, or to apply some combination of adjusting dynamically and then at predetermined times. As described above, the various parameters used by logic 138 may be hard coded in logic 138, supplied by the industrial system via communication port 170, or any combination thereof.

Figure 6A:
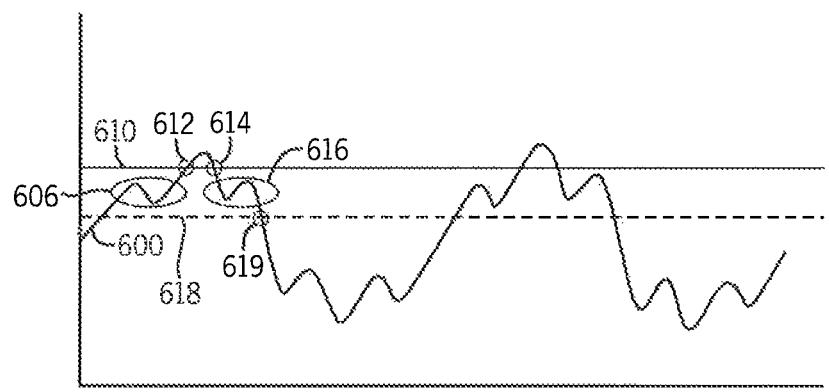
FIG. 6a is an example analog waveform of an electrical input signal provided by a sensor as a machine operates slowly, showing the effects of EMI or signal crosstalk on the signal integrity of the electrical input signal, and showing the related upper and lower values of the hysteresis range.
Figure 6B:
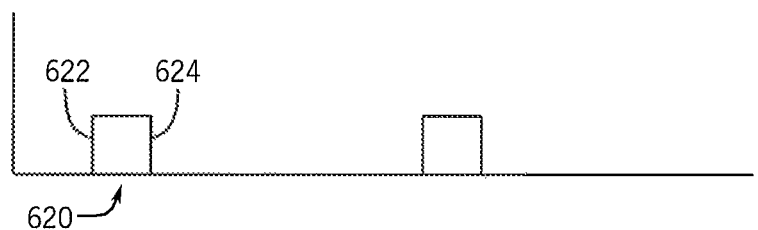

With the hysteresis generator, and referring now to FIG. 6a, an electrical input signal 600 is shown as it might appear at the input port 100 of the controller circuit 30. The electrical input signal 600 has a low frequency and small amplitude which may indicate a weak signal from a slowly moving machine. The electrical input signal 600 is also more susceptible to EMI and has poor signal integrity, including noise 606 and 616. As the electrical input signal 600 crosses the upper value 610 at the intersection 612, the threshold detector 118 produces the electrical digital output signal 620 transitioning to the logic one state 622 shown in FIG. 6b. However, despite the electrical input signal then falling back below the upper value at intersection 614, and despite noise induced ringing 616 on the electrical input signal, the electrical digital output signal 620 stays in the logic one state. As the electrical input signal 600 crosses the lower value 618 at the intersection 619, the threshold detector 118 produces the electrical digital output signal 620 transitioning to the logic zero state 624 shown in FIG. 6b. Here, the upper value 610 and lower value 618 provided by the hysteresis generator 160 allows the threshold detector 118 to produce the electrical digital output signal 620 at the correct frequency.

Figure 7A:
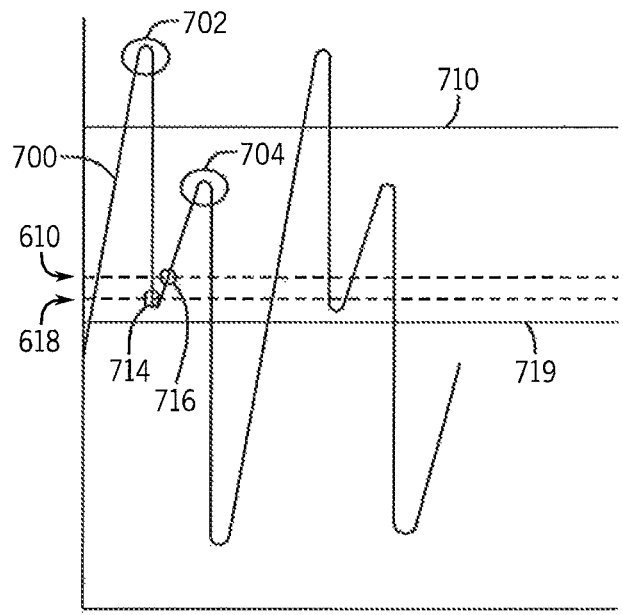
FIG. 7a is an example analog waveform of an electrical input signal provided by a sensor as a machine operates quickly, showing the effects of EMI or signal crosstalk on the signal integrity of the electrical input signal, and showing a related narrow hysteresis range of FIG. 6a and an alternatively broadened hysteresis range.
Figure 7B:
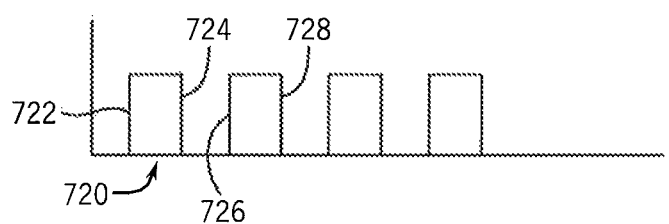
FIG. 7b is an example waveform of an electrical digital output signal produced by comparing the electrical input signal of FIG. 7a to the related narrow hysteresis range of FIG. 6 thereby producing an incorrect digital frequency.

Referring now to FIG. 7a, the same electrical input signal 700 now appears later in time having a high frequency and large amplitude, which may indicate a stronger signal from a more quickly moving machine. The high frequency and large amplitude of the electrical input signal 700 results in an overshoot 702 and ringing 704. Using the same upper value 610 and lower value 618 from before, despite the increase in frequency and amplitude, causes the threshold detector 118 to produce an electrical digital output signal 720 with an incorrect doubled frequency shown in FIG. 7b. In other words, due to the increased overshoot 702 and ringing 704, the electrical input signal 700 crosses the lower value 618 and upper value 610 at additional intersections 714 and 716, respectively. As a result, the electrical digital output signal 720 incorrectly includes additional transitions 724 and 726, resulting in an incorrectly doubled frequency.

Figure 7C:
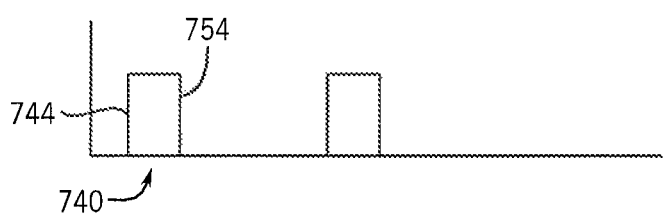
FIG. 7c is an example waveform of an electrical digital output signal produced by comparing the electrical input signal of FIG. 7a to the alternatively broadened hysteresis range of FIG. 7a, thereby producing the correct digital frequency.

However, with the hysteresis generator 160 operative to adjust the amount of hysteresis feedback in response to the measured higher frequency, and thus the upper value 710 and lower value 719, the threshold detector 118 produces the correct electrical digital output signal 740 shown in FIG. 7c. The increased overshoot 702 and ringing 704 does not result in crossing the lower value 719 and upper value 710 at additional intersections. Thus, the proper frequency is produced.

Figure 8:
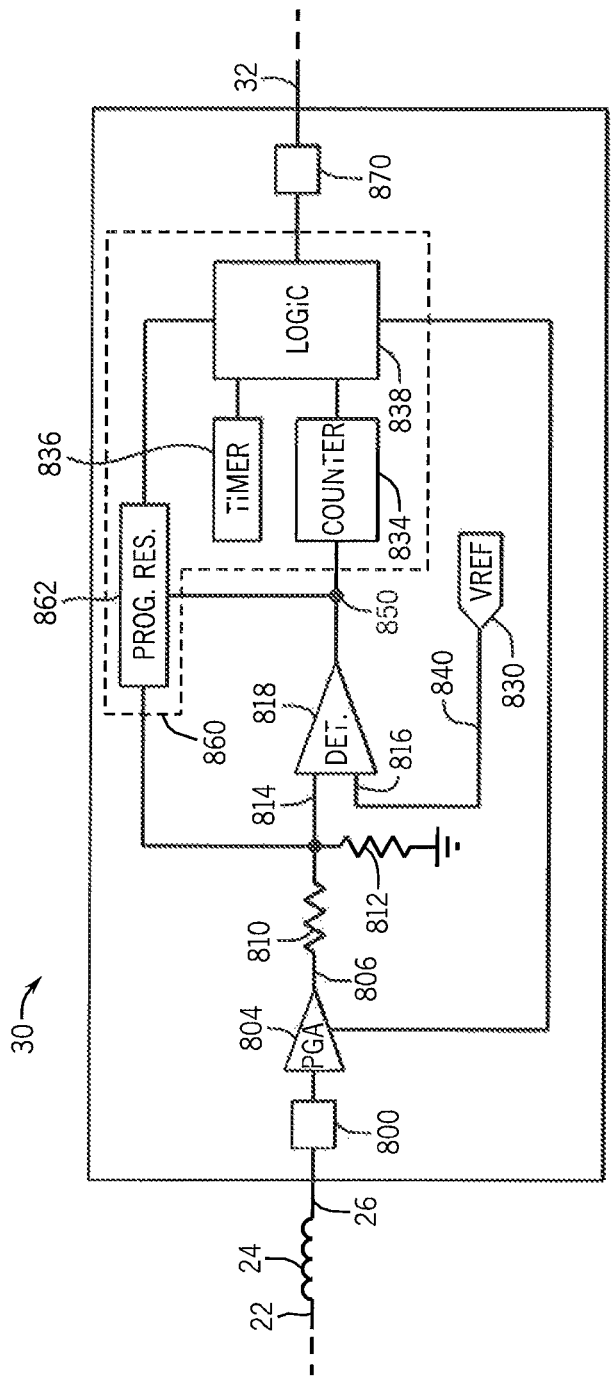
FIG. 8 is an alternative embodiment of an industrial I/O controller circuit of the present invention, which is a part of the industrial control system.

Referring now to FIG. 8, in an alternative embodiment, the controller circuit 30 has an input port 800 for receiving the electrical input signal produced by the sensor 20. From the input port 800, the electrical input signal passes to a programmable gain amplifier 804 which may be digitally controlled to produce an amplified signal 806. The programmable gain amplifier 804 in turn connects through a voltage divider comprised of resistors 810 and 812, and then to an input 814 of a threshold detector 818, which may be, for example, the non-inverting input of an analog comparator or an operational amplifier configured to operate in saturation. The threshold detector 818 compares the electrical input signal received at its input 814 to a threshold level provided by a reference voltage 830 that is received at another input 816 of the threshold detector 818, which may be, for example, the inverting input of an analog comparator or an operational amplifier. In operation, if the electrical input signal received at the input 814 is detected by the threshold detector 818 to be below the threshold level received at the other input 816, then the threshold detector 818 will produce an electrical digital output signal at conductor 850 having a first digital state, such as a logic zero. If the electrical input signal received at the input 814 is detected by the threshold detector 818 to be above the threshold level received at the other input 816, then the threshold detector 818 will produce an electrical digital output signal at conductor 850 having a second digital state, such as a logic one. The threshold detector 818 thereby produces a square wave digital output signal at conductor 850.

Similar to the embodiment described in FIG. 2, the controller circuit 30 further includes a hysteresis generator 860 to provide hysteresis feedback to the electrical input signal at the input 814 of the threshold detector 818. The hysteresis generator 860 may be operative to adjust the amount of hysteresis feedback based on the measured frequency. In operation, the electrical digital output signal at conductor 850 is transmitted to a hysteresis generator 860, which may comprise a microcontroller or other programmable logic, comprising a counter 834, a timer 836, processing logic 838 and a digitally programmable resistor 862. The electrical digital output signal at conductor 850 is received by the hysteresis generator 860 at the counter 834, which may count the transitions between the first state and the second state of the electrical digital output signal and report the counted transitions to the logic 838. The timer 836 provides a time base to the logic 838, so that the logic 838 may continuously or occasionally measure the frequency of the electrical digital output signal by dividing the count received by the counter 834 over a length of, time received by the timer 836, e.g. cycles per second (Hz). The controller circuit 30 may also have a communication port 870 coupled to logic 838, which may externally communicate bi-directional digital data over backplane 32 according to known protocols. The data communicated may include reporting the measured frequency or other data to the industrial system, or receiving configuration information or other data from the industrial system.

The logic 838 may then adjust the resistor 862 in response to the measured frequency, thereby adjusting the amount of hysteresis feedback to the input 814 of the threshold detector 818. For example, if the logic 838 measures a lower frequency, e.g. 10 Hz, then the logic 838 may digitally control the resistor 862 to provide less feedback to the input 814 of the threshold detector 818. If the logic 838 measures a higher frequency, e.g. 5 kHz, then the logic 838 may digitally control the resistor 862 to provide more feedback to the input 814 of the threshold detector 818. In an alternative embodiment, feedback may instead be provided to the input 816 of the threshold detector 818. The logic 838 may digitally control the resistor 862 to adjust the amount of feedback dynamically, such as adjusting the amount of hysteresis feedback continuously in response to continuous changes in frequency to the granularity that the resistor 862 allows. In addition, the logic 838 may digitally control the resistor 862 to apply a predetermined amount of feedback in response to reaching a predetermined frequency amount, or to apply some combination of adjusting dynamically and then at predetermined times. As described above, the various parameters used by logic 838 may be hard coded in logic 838, supplied by the industrial system via communication port 870, or any combination thereof.

The logic 838 may similarly adjust the programmable gain amplifier 804 in response to the measured frequency, thereby adjusting the amount of gain produced at amplified signal 806. For example, if the logic 838 measures a lower frequency, e.g. 10 Hz, then the logic 838 may digitally control the programmable gain amplifier 804 to provide more gain in producing amplified signal 806. If the logic 838 measures a higher frequency, e.g. 5 kHz, then the logic 838 may digitally control the programmable gain amplifier 804 to provide less gain in producing amplified signal 806. The logic 838 may digitally control the programmable gain amplifier 804 to adjust the amount of gain dynamically, such as adjusting the amount of gain continuously in response to continuous changes in frequency to the granularity that the programmable gain amplifier 804 allows. In addition, the logic 838 may digitally control the programmable gain amplifier 804 to apply a predetermined amount of gain in response to reaching a predetermined frequency amount, or to apply some combination of adjusting dynamically and then at predetermined times. Again, the various parameters used by logic 838 may be hard coded in logic 838, supplied by the industrial system via communication port 870, or any combination thereof.

Figure 9:
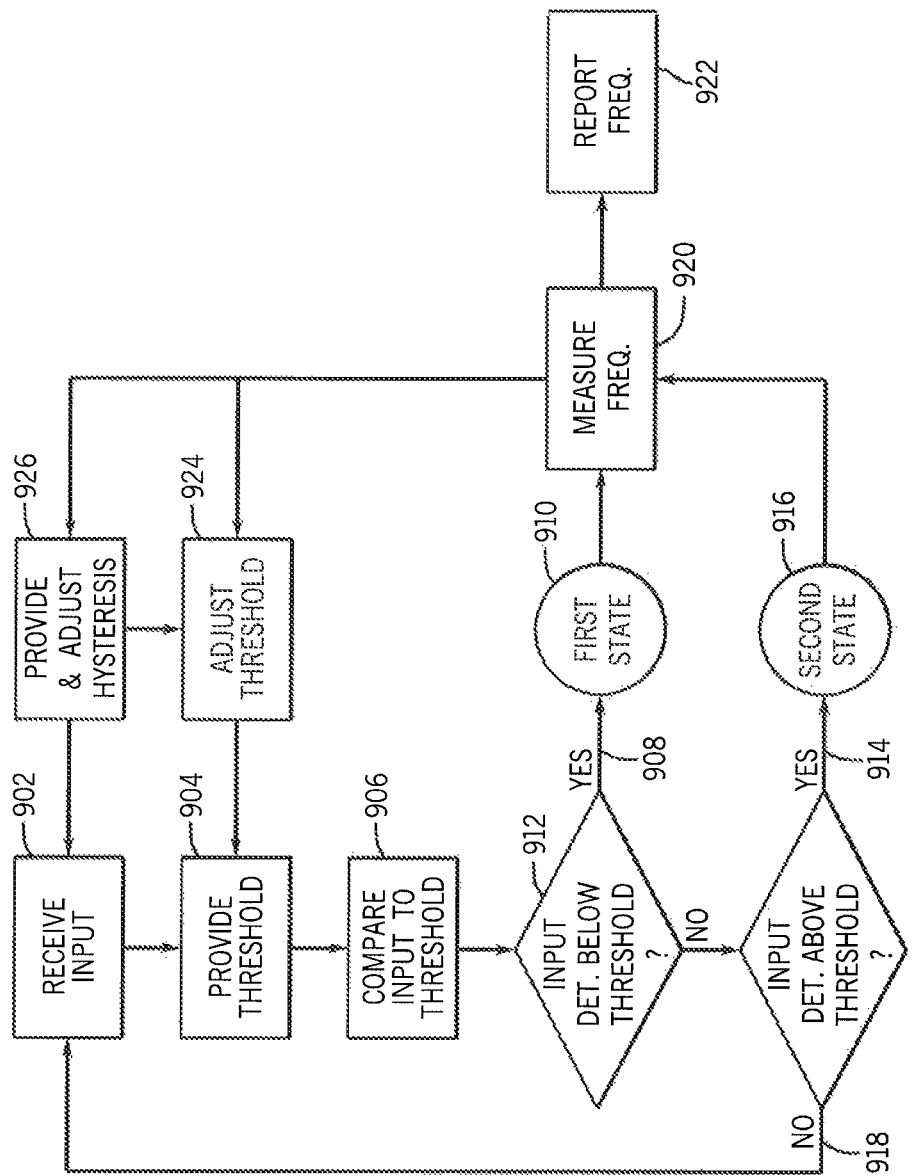
FIG. 9 is a flow chart illustrating an embodiment of a method for measuring the frequency of an electrical input signal in an industrial I/O controller according to the present invention.

Referring now to FIG. 9, a method for measuring the frequency of an electrical input signal in an industrial I/O controller is shown. The method comprises receiving an electrical input signal 902 having a frequency provided by a sensor, providing a threshold level 904, and comparing the electrical input signal to the threshold level to produce an electrical digital output signal 906. If the electrical input signal is detected below the threshold level 908, the electrical digital output signal will have a first state 910. If the electrical input signal is not detected below the threshold level 912, and the electrical input signal is detected above the threshold level 914, the electrical digital output signal will have a second state 916. If the electrical input signal is not detected below the threshold level 912, and the electrical input signal is not detected above the threshold level 918, such as an electrical input signal in the hysteresis range, the previous state is maintained and the method continues receiving the electrical input signal 902. The electrical digital output signal having the first state 910, or having the second state 916 is then used to measure the frequency of change between the first state and the second state of the electrical digital output signal 920, which is then reported to the industrial system 922.

The method may then adjust the threshold level 924 in response to the frequency of change between the first state and the second state of the electrical digital output signal. Measuring the frequency of change 920 and adjusting the threshold level 924 may further comprise counting one or more transitions between the first state and the second state of the electrical digital output signal over a length of time. The method may further comprise setting the threshold level to a predetermined value in response to the frequency of change between the first state and the second state of the electrical digital output signal reaching a predetermined amount.

The method may also provide hysteresis feedback 926 from the electrical digital output signal to the electrical input signal, which feedback may also be adjusted in response to the frequency of change between the first state and the second state of the electrical digital output signal. The method may also set the amount of hysteresis feedback to a predetermined amount in response to the frequency of change between the first state and the second state of the electrical digital output signal reaching a predetermined amount.

Certain terminology is used herein for purposes of reference only, and thus is not intended to be limiting. For example, terms such as "upper," "lower," "above" and "below" refer to directions in the drawings to which reference is made. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that, additional or alternative steps may be employed.

References to "a microcontroller" can be understood to include one or more microcontrollers, processors or microprocessors that can communicate in a stand-alone and/or a distributed environment(s), and can thus be configured to communicate via wired or wireless communications with other microcontrollers, where such one or more microcontrollers can be configured to operate on one or more microcontroller-controlled devices that can be similar or different devices. Furthermore, references to "logic," unless otherwise specified, can include one or more microcontroller-readable and accessible logic or memory elements and/or components that can be internal to the microcontroller-controlled device, or external to the microcontroller-controlled device, and can be accessed via a wired or wireless network.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims. It is specifically intended that the present invention not be limited to the embodiments and illustrations contained herein and the claims should be understood to include modified forms of those embodiments including portions of the embodiments and combinations of elements of different embodiments as come within the scope of the following claims.

What is claimed is:

1. An industrial control circuit for measuring the frequency of an electrical input signal, the circuit comprising:
   an input port for receiving an electrical input signal having a frequency;
   an adjustable threshold generator providing an adjustable threshold level;
   a threshold detector coupled to the input port for receiving the electrical input signal and to the adjustable threshold generator for receiving the adjustable threshold level for comparing the electrical input signal to the threshold level to produce an electrical digital output signal having a first state when the electrical input signal is detected below the threshold level and a second state when the electrical input signal is detected above the threshold level; and
   an adjustable hysteresis generator providing an adjustable amount of hysteresis feedback from the output of the threshold detector to the electrical input signal, wherein the hysteresis generator is operable to add to or subtract from the electrical input signal to increase opposition of the electrical input signal to crossing the threshold level;

wherein the adjustable threshold generator is operative to adjust the threshold level in response to the frequency of the electrical input signal; and wherein the adjustable hysteresis generator is operative to adjust the amount of hysteresis feedback in response to the frequency of the electrical input signal.

2. The circuit of claim 1, wherein the threshold generator further comprises a counter and a timer for counting one or more transitions between the first state and the second state of the electrical digital output signal over a length of time and wherein the value of the counter is used to determine the frequency of the electrical input signal for adjusting the threshold level.

3. The circuit of claim 1, wherein the threshold generator sets the threshold level between a discrete first and second predetermined threshold level in response to the frequency of the electrical input signal reaching a predetermined frequency amount.

4. The circuit of claim 1, further comprising a housing including a screw terminal connected to the input port, and holding circuitry of the threshold generator, the threshold detector and the hysteresis generator, and further including a communication port coupled to the threshold generator for external digital data communication.

5. An industrial control module for measuring the frequency of an electrical input signal, the control module comprising:
an input port for receiving an electrical input signal having a frequency;
an amplifier coupled to the input port for receiving the electrical input signal and providing an amplified signal;
an adjustable threshold generator providing an adjustable threshold level; and
a threshold detector coupled to the amplifier for receiving the amplified signal and to the adjustable threshold generator for receiving the adjustable threshold level for comparing the amplified signal to the threshold level to produce an electrical digital output signal having a first state when the amplified signal is detected below the threshold level and a second state when the amplified signal is detected above the threshold level; and
an adjustable hysteresis generator providing an adjustable amount of hysteresis feedback from the output of the threshold detector to the amplified signal, wherein the hysteresis generator is operable to add to or subtract from the amplified to increase opposition of the amplified signal to crossing the threshold level;
wherein the adjustable threshold generator provides a higher threshold level in response to a higher frequency of the electrical input signal and a lower threshold level in response to a lower frequency of the electrical input signal; and
wherein the adjustable hysteresis generator provides a higher amount of hysteresis feedback in response to a higher frequency of the electrical input signal and a lower amount of hysteresis feedback in response to a lower frequency of the electrical input signal.

6. The control module of claim 5, wherein the hysteresis generator further comprises a counter and a timer for counting one or more transitions between the first state and the second state of the electrical digital output signal over a length of time and wherein the value of the counter is used to determine the frequency of the electrical input signal for adjusting the amount of hysteresis feedback.

7. The control module of claim 5, wherein the threshold generator is further coupled to the amplifier to adjust the gain of the amplifier in response to the frequency of the electrical input signal.

8. The control module of claim 7, wherein the threshold generator sets the gain of the amplifier to a predetermined amount in response to the frequency of the electrical input signal reaching a predetermined frequency amount.

9. The control module of claim 7, further comprising a housing including a screw terminal connected to the input port, and holding circuitry of the amplifier, the threshold generator, the threshold detector and the hysteresis generator, and further including a communication port coupled to the threshold generator for external digital data communication.

10. A method for measuring the frequency of an electrical input signal for an industrial control system, the method comprising:
receiving an electrical input signal having a frequency;
providing an adjustable threshold level;
comparing the electrical input signal to the adjustable threshold level to produce an electrical digital output signal having a first state when the electrical input signal is detected below the threshold level and a second state when the electrical input signal is detected above the threshold level;
providing an adjustable amount of hysteresis feedback to the electrical input signal, wherein the amount of hysteresis adds to or subtracts from the electrical input signal to increase opposition of the electrical input signal to crossing the threshold level;
measuring the frequency of change between the first state and the second state of the electrical digital output signal;
adjusting the threshold level and the amount of hysteresis feedback in response to the measured frequency; and
reporting the measured frequency to an industrial control system.

11. The method of claim 10, further comprising providing a high threshold level or a low threshold level for adjusting depending on a direction of transition of the electrical input signal to provide hysteresis.

12. The method of claim 11, further comprising adjusting the separation between the high threshold level and the low threshold level depending on the frequency of the electrical input signal.

13. The method of claim 12, further comprising setting the amount of hysteresis feedback to a predetermined amount in response to the measured frequency reaching a predetermined amount.

14. The circuit of claim 1, further comprising a programmable gain amplifier (PGA) amplifying the electrical input signal received by threshold detector.

15. The circuit of claim 14, wherein the gain of the PGA is adjusted in response to the frequency of the electrical input signal.

16. The circuit of claim 1, wherein the adjustable threshold generator includes a digital to analog converter (DAC), a counter and a timer.

17. The circuit of claim 1, wherein the adjustable hysteresis generator includes a programmable resistor.

18. The control module of claim 5, further comprising a communication port for externally communicating the electrical digital output signal.

* * * * *